United States Patent
Hardy et al.

(10) Patent No.: US 9,563,512 B1
(45) Date of Patent: Feb. 7, 2017

(54) HOST RECOVERY BASED ON RAPID INDICATION OF ESTIMATED RECOVERY TIME

(71) Applicant: INTERNATIONAL BUSINESS MACHINES CORPORATION, Armonk, NY (US)

(72) Inventors: Clint A. Hardy, Tucson, AZ (US); Matthew J. Kalos, Tucson, AZ (US); Bradley S. Powers, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,896

(22) Filed: Jan. 5, 2016

(51) Int. Cl.
G06F 11/00 (2006.01)
G06F 11/14 (2006.01)
G06F 3/06 (2006.01)

(52) U.S. Cl.
CPC ......... G06F 11/1415 (2013.01); G06F 3/0619 (2013.01); G06F 3/0629 (2013.01); G06F 3/0683 (2013.01); G06F 2201/805 (2013.01)

(58) Field of Classification Search
CPC .................. G06F 11/0727; G06F 11/0793
See application file for complete search history.

(56) References Cited

U.S. PATENT DOCUMENTS

| | | | | |
|---|---|---|---|---|
| 6,907,551 | B2* | 6/2005 | Katagiri | G06F 11/327 714/48 |
| 7,185,231 | B2* | 2/2007 | Mullally | G06F 11/008 714/37 |
| 7,500,150 | B2* | 3/2009 | Sharma | G06F 11/34 714/39 |
| 8,037,341 | B2* | 10/2011 | Lumpp | G06F 11/2028 702/186 |
| 8,589,924 | B1* | 11/2013 | Johnsen | G06F 9/505 718/100 |
| 9,021,308 | B2* | 4/2015 | Cantor | G06F 11/321 714/38.1 |
| 2006/0074993 | A1* | 4/2006 | Pulamarasetti | G06F 11/1458 |
| 2007/0260908 | A1* | 11/2007 | Mitchell | G06F 11/3409 714/2 |
| 2009/0172689 | A1* | 7/2009 | Bobak | G06F 9/5061 718/104 |
| 2011/0239048 | A1* | 9/2011 | Andrade | G06F 11/3616 714/35 |
| 2013/0173558 | A1 | 7/2013 | Whisenant et al. | |
| 2014/0351627 | A1 | 11/2014 | Best et al. | |
| 2015/0006830 | A1 | 1/2015 | Shin et al. | |

* cited by examiner

*Primary Examiner* — Elmira Mehrmanesh
(74) *Attorney, Agent, or Firm* — Griffiths & Seaton PLLC

(57) ABSTRACT

Various embodiments managing host recovery operations in a computing storage environment, by a processor device, are provided. Real-time indications are provided from a device to each of at least one of a plurality of hosts that a connected storage controller is entering a recovery operation, and real-time sense data is provided to the at least one of the plurality of hosts for presenting an indication of an expected recovery timeframe.

12 Claims, 3 Drawing Sheets

HOST RECOVERY BASED ON RAPID INDICATION OF ESTIMATED RECOVERY TIME

BACKGROUND OF THE INVENTION

Field of the Invention

The present invention relates in general computing systems, and more particularly to, various embodiments for managing host recovery operations in computing storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically qui a large amount of data storage. Customer data, or data generated by users within the data processing system, occupies a great portion of this data storage. Many hosts may be connected to storage controllers of these storage systems by way of host adapters.

SUMMARY OF THE INVENTION

Various embodiments for managing host recovery operations in a computing storage environment, by a processor, are provided. In one embodiment, by way of example only, real-time indications are provided from a device to each of at least one of a plurality of hosts that a connected storage controller is entering a recovery operation, and real-time sense data is provided to the at least one of the plurality of hosts for presenting an indication of an expected recovery timeframe.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Host recovery in mirrored storage environments has the need for reliable, rapid indications that a storage controller is entering a recovery operation, and what the expected recovery timeframe is. In other words, hosts have an interest in determining if a connected storage controller of a storage system is entering a recovery operation (i.e. a warmstart), and what the expected timeframe is until normal operations may resume. Traditionally, however, only specific failures trigger storage system swap events, and input/output (I/O) operation timeouts are used as a stop gap. I/O timeouts are not robust nor rapid, in such that they provide no indication of an expected recovery timeframe, and by very nature require a certain timeframe to have passed before a failure is even detected. In most cases, during a recovery operation, a storage controller is labeled such as "control unit busy", and detailed communications to the controller are blocked from the hosts. The hosts have no indication that the storage controller has entered a recovery operation, nor what the expected timeframe for recovery is.

Accordingly, in one embodiment, the mechanisms of the illustrated embodiments provide "sense data" to each interested host through a host adapter, indicating that a connected storage controller has entered a recovery operation, and what the expected recovery timeframe is. The sense data provides a real-time indication of the expected recovery timeframe, and updates the host if the expected recovery time will be shorter or longer than expected. The host is then notified when the recovery operation has completed.

It is important to note that although throughout the present disclosure a host adapter is widely referenced for providing the sense data to produce the real-time indications of recovery operations and expected recovery timeframes, this terminology is strictly for illustrative and exemplary purposes only. One of ordinary skill in the art would recognize the functionality disclosed herein may be performed by any device capable of implementing the mechanisms discussed below. This device may be a host adapter, a processor associated with a cache, or any other such device known in the art.

Figure 1:
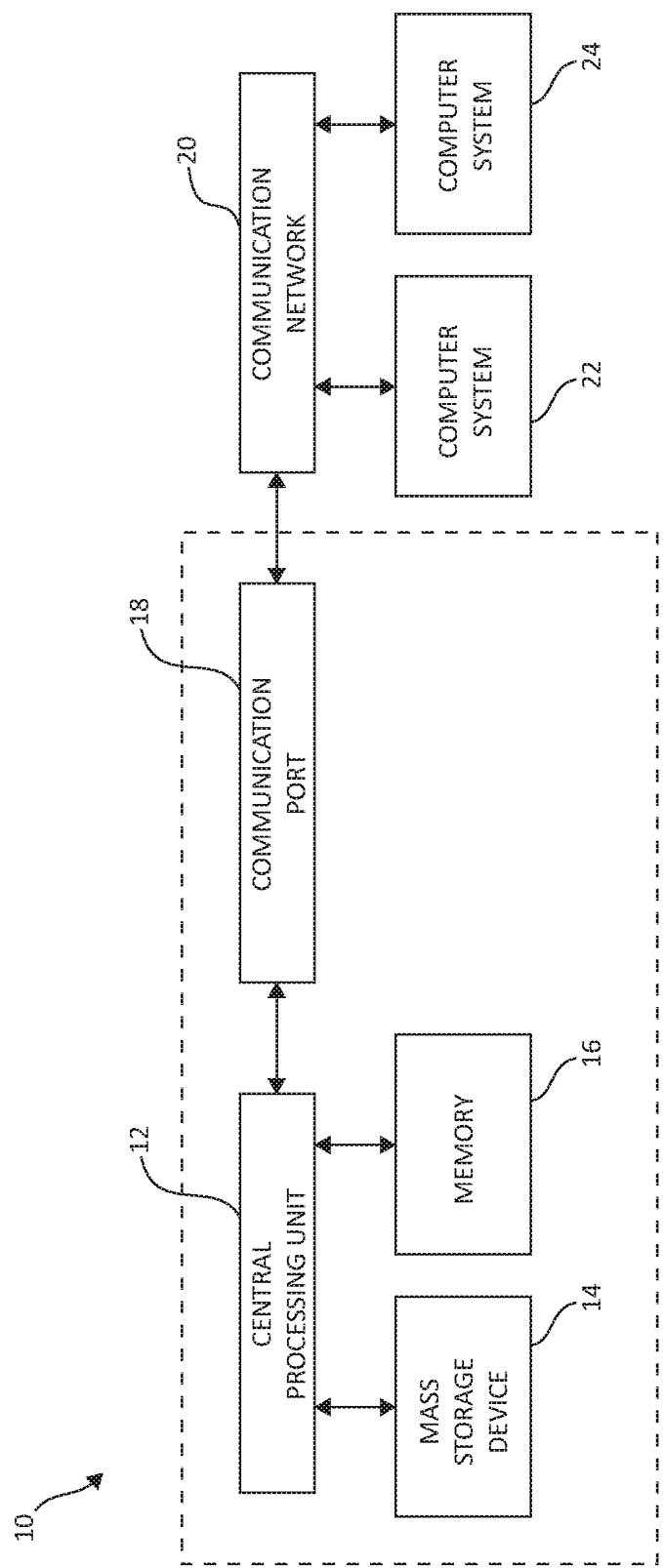
FIG. 1 is a block diagram showing a hardware structure for managing host recovery operations, in which aspects of the present invention may be realized.

Turning first to FIG. 1, exemplary architecture 10 of a computing system environment is depicted. Architecture 10 may, in one embodiment, be implemented at least as part of a system for effecting mechanisms of the present invention. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
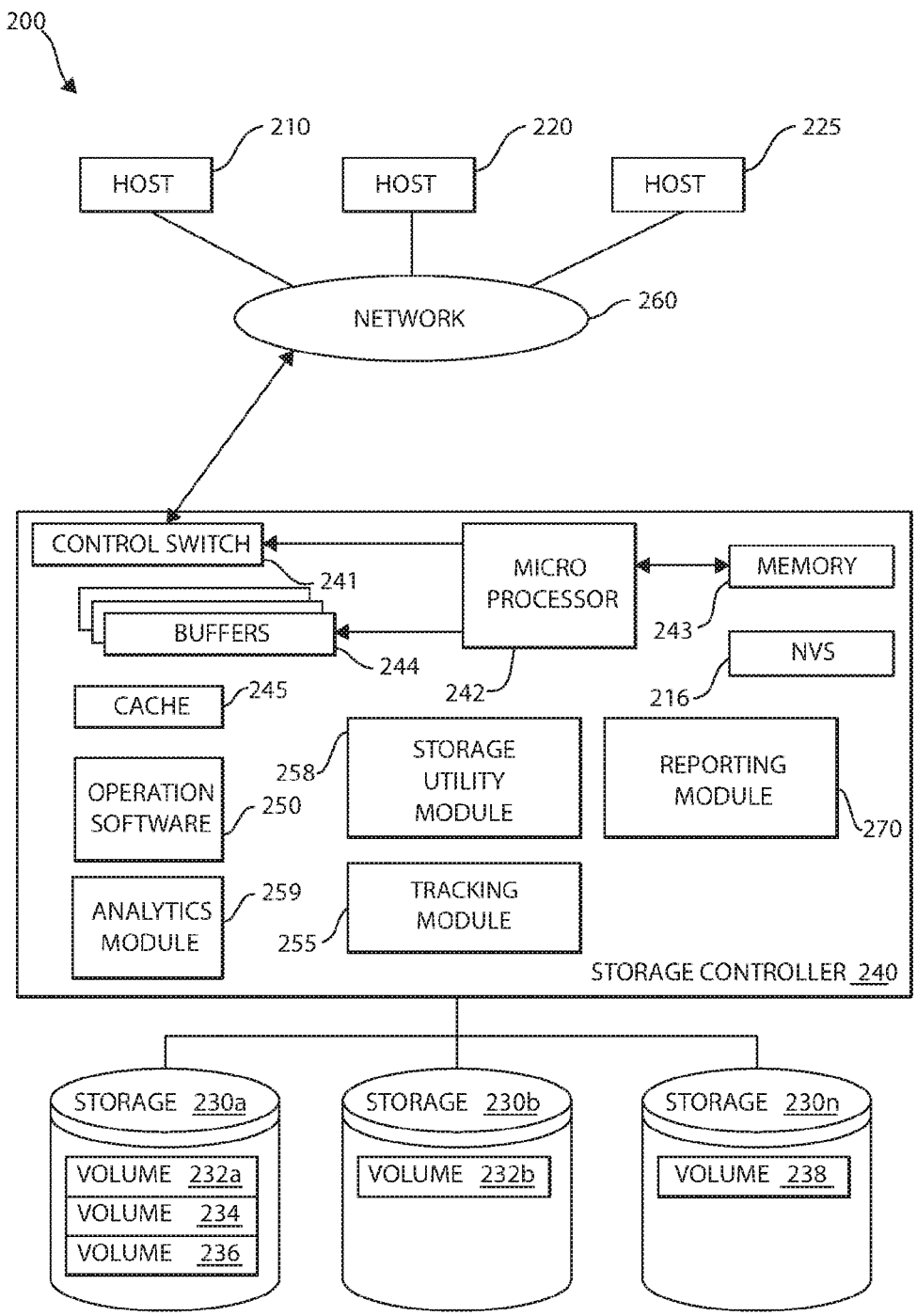
FIG. 2 is a block diagram showing a hardware structure of a data storage system in a computing storage environment, again in which aspects of the present invention may be realized.

FIG. 2 is an exemplary block diagram 200 showing a hardware structure of a data storage system that may be used in the overall context of the mechanisms of the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™, although one of ordinary skill in the art will recognize that a variety of hardware and software, separately or in combination, may be utilized to implement the data deduplication functionality according to aspects of the illustrated embodiments.

A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n herein) may be comprised of one or more storage devices, such as storage arrays, which are connected to storage controller 240 (by a storage network) with one or more cluster hosts 210, 220, and 225 connected to each storage controller 240 through network 260.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory," for buffering "write data" and "read data," which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a tracking module 255, a storage utilization module 258, and a reporting module 270. The tracking module 255, storage utilization module 258 and reporting module 270 may operate in conjunction with each and every component of the storage controller 240, the hosts 210, 220, 225, and storage devices 230. The tracking module 255, storage utilization module 258 and reporting module 270 may be structurally one complete module or may be associated and/or included with other individual modules. The tracking module 255, storage utilization module 258 and reporting module 270 may also be located in the cache 245 or other components.

The tracking module 255, storage utilization module 258 and reporting module 270 may individually and/or collectively perform various aspects of the present invention as will be further described. For example, the tracking module 255 may perform tracking operations and related analytics in accordance with aspects of the illustrated embodiments. The storage utilization module 258 may also utilize analytics to determine physical or virtual storage capacities in view of deduplication functionality operational on particular storage devices. Finally, reporting module 270 may notify various portions of the data storage and deduplication system 200 about such various aspects as current capacity utilization, and so forth. As one of ordinary skill in the art will appreciate, the tracking module 255, storage utilization module 258, and reporting module 270 may make up only a subset of various functional and/or functionally responsible entities in the data storage and deduplication system 200.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the tracking module 255, and the analytics module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

Figure 3:
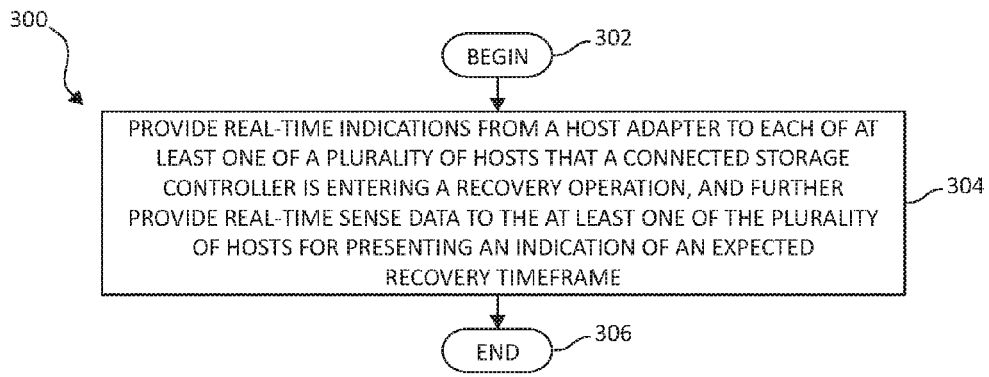
FIG. 3 is a flow chart diagram illustrating a method for managing host recovery operations, in accordance with various aspects of the present invention.

Turning now to FIG. 3, a flow chart diagram illustrating an exemplary method 300 for managing host recovery operations, among other aspects of the illustrated embodiments, is depicted. The method 300 begins (step 302). Real-time indications are provided from a host adapter, or other such device, to each of at least one of a plurality of hosts that a connected storage controller is entering a recovery operation, and real-time sense data is provided to the at least one of the plurality of hosts for presenting an indication of an expected recovery timeframe (step 304). The method then ends (step 306).

As previously mentioned, currently, a host adapter is notified when a connected storage controller enters a warmstart. The host adapter then generates a "control unit busy" notification to any new I/O operations, and active I/O operations are failed with a "unit check" notification. In order to provide sense data indications from the host adapter, in one embodiment, the present invention uses pushed asynchronous notifications to each host. The asynchronous notifications provide status updates to each host regardless of whether the host was engaged in any I/O operations at the time of the warmstart of the storage controller. The status updates may contain a "unit check" notification along with sense data indicating a "long busy" notification, with an estimated recovery time.

Sense data is not able to be provided if there is a pending reset notification for a given path, because reset notification sense must be provided before any other sense indication. Since it is indeterminate which devices currently may have a pending reset notification for each path on the host adapter, devices may be selected. In one embodiment, devices may be selected by hardcoding a device 0. In another embodiment, an indication per path to contain a "chosen" device method is used. In other embodiments, a bitmap of eligible devices per path may be employed. The bitmap indicates installed devices which do not have reset notify pending. The sense data is presented (and accepted) once per logical path that is enabled for this function. The first device to receive the sense data may be the first device that received a start, or may be a first device selected for asynchronous notifications. In one embodiment, a system characteristic may be used to enable the features provided herein, and the host adapter provided a bitmap of which logical paths accept the sense data indications.

In one embodiment, notifications are sent to the host adapter to indicate intermediate steps in the warmstart operation. The host adapter uses these intermediate steps as checkpoints, and time progresses to meeting these intermediate steps. If a checkpoint is missed (fails to complete in a predetermined timeframe), another round of unit checks is generated to indicate the new (and later) expected recovery complete time. In another embodiment, various other events may be generated to the host adapter to proactively indicate a longer recovery timeframe. For example, it is known that cache validation is a longer process, so the host adapter may be notified immediately when the process began.

The sense data may either contain a timeframe value directly, or a severity indication value. If, for example, a severity value indication is used, a separate table may be cross-referenced to with the severity value to indicate to the host the expected recovery timeframe for each value.

Under the mechanisms of the present invention, the host adapters act independently from one another. This means multiple paths will attempt to give a unit check simultaneously. In one embodiment, a first path to the subchannel will create a dedicated allegiance to that path until the sense data is cleared. Other paths may stack their unit checks. When each sense completes, the other unit check notifications will be unstacked, and repeats until all paths accept the unit check. The host software that enables this must handle the repetitive indication.

Path validation commands need special handling since they have tighter retry and timing requirements. Until a failure indication is offloaded, unit check notifications and sense data is supplied to a single path validation command. Once the failure indication has been offloaded asynchronously, or failed a path validation command with the indication, further path validation commands will receive the control unit busy notification to avoid loss of the path to the given device.

The host adapter presents a "control unit no longer busy" notification to the host before sending an initial expected recovery time by sense data, or when sending an update to clear any control unit busy notifications to a dedicated allegiance indication that may have been set.

Figure 4:
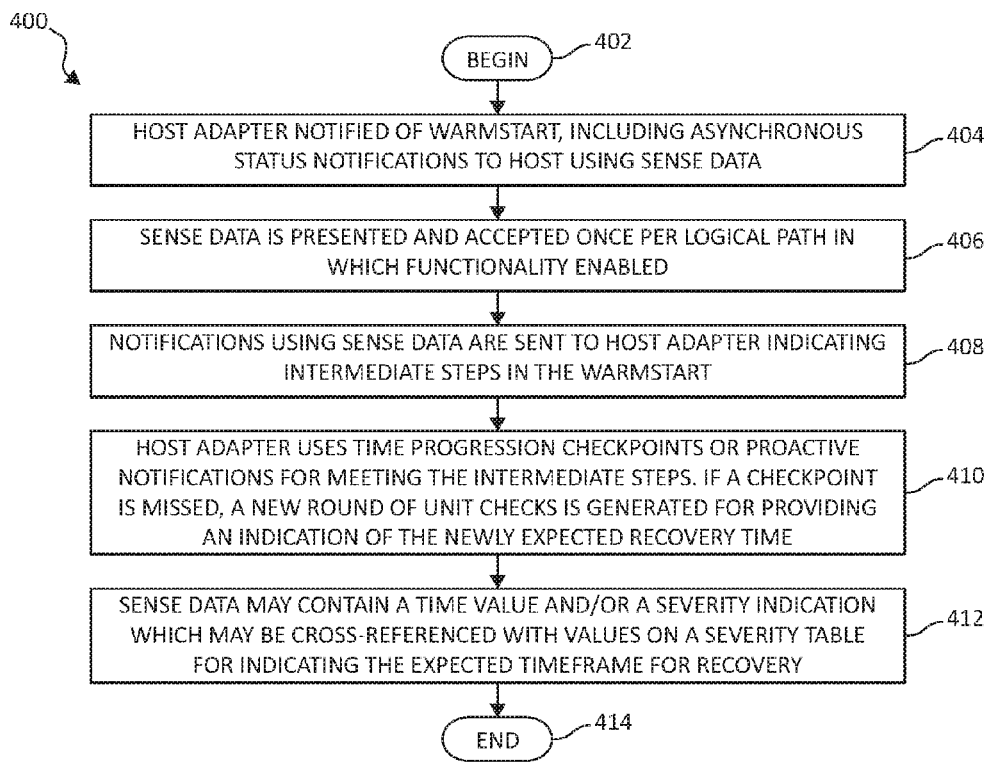
FIG. 4 is an additional flow chart diagram illustrating a method for managing host recovery operations, in accordance with various aspects of the present invention.

FIG. 4 illustrates a method 400 of managing host recovery operations in review of the mechanisms of the present invention. Beginning at step 402, a host adapter is notified of a connected storage controller warmstart, including asynchronous status notifications to a host using sense data (step 404). The sense data is presented and accepted once per logical path in which the functionality is enabled (step 406). Notifications using sense data are sent to the host adapter indicating intermediate steps occurring in the warmstart comprising checkpoints (step 408).

The host adapter uses these time progression checkpoints or proactive notifications for meeting the intermediate steps in the warmstart. If a checkpoint is missed by failing to complete within a predetermined timeframe, a new round of unit checks is generated for providing an indication of the newly expected recovery timeframe (step 410). The sense data may contain a timeframe value and/or a severity indication which may be cross-referenced with values on a severity table for indicating the expected timeframe for recovery (step 412). The method ends (step 414).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing host recovery operations in a computing storage environment, by a processor, comprising:
    providing real-time indications from a device to each of at least one of a plurality of hosts that a connected storage controller is entering a recovery operation, and further providing real-time sense data to the at least one of the plurality of hosts for presenting a real-time indication of an expected recovery timeframe; wherein providing the sense data includes pushing asynchronous notifications from the device to the at least one of the plurality of hosts;
    presenting the sense data by the device to the at least one of the plurality of hosts once per enabled logical path, the enabled logical paths being provided by a bitmap;
    providing notifications from the storage controller to the device of intermediate steps, which comprise checkpoints during a warmstart of the storage controller; and monitoring, by the device, the checkpoints provided by notification by the storage controller; wherein the checkpoints are either completed or failed by determination of a predetermined timeframe.

2. The method of claim 1, further including using the checkpoints, by the device, to provide the expected recovery timeframe by sense data to the at least one of the plurality of hosts.

3. The method of claim 1, wherein, for providing the expected recovery timeframe, the sense data contains one of a time value indication and a severity indication, the severity indication being cross-referenced with a table of time value indications.

4. The method of claim 1, further including notifying the at least one of the plurality of hosts when the recovery operation is completed.

5. A system for managing host recovery operations in a computing storage environment, the system comprising:
    a processor; and
    a device in communication with the processor, wherein the processor:
    provides real-time indications from the device to each of at least one of a plurality of hosts that a connected storage controller is entering a recovery operation, and further provides real-time sense data to the at least one of the plurality of hosts for presenting a real-time indication of an expected recovery timeframe; wherein the processor provides the sense data by pushing asynchronous notifications from the device to the at least one of the plurality of hosts;
    wherein the processor presents the sense data by the device to the at least one of the plurality of hosts once per enabled logical path, the enabled logical paths being provided by a bitmap;
    wherein the processor provides notifications from the storage controller to the device of intermediate steps comprising checkpoints during a warmstart of the storage controller; and monitors, by the device, the checkpoints provided by notification by the storage controller; wherein the checkpoints are either completed or failed by determination of a predetermined timeframe.

6. The system of claim 5, wherein the processor uses the checkpoints, by the device, to provide the expected recovery timeframe by sense data to the at least one of the plurality of hosts.

7. The system of claim 5, wherein, for providing the expected recovery timeframe, the sense data contains one of a time value indication and a severity indication, the severity indication being cross-referenced with a table of time value indications.

8. The system of claim 5, wherein the processor notifies the at least one of the plurality of hosts when the recovery operation is completed.

9. A computer program product for managing host recovery operations in a computing storage environment, by a processor, the computer program product embodied on a non-transitory computer-readable storage medium having computer-readable program code portions stored therein, the computer-readable program code portions comprising:
    an executable portion that provides real-time indications from a device to each of at least one of a plurality of hosts that a connected storage controller is entering a recovery operation, and further provides real-time sense data to the at least one of the plurality of hosts for presenting a real-time indication of an expected recovery timeframe; wherein providing the sense data includes pushing asynchronous notifications from the device to the at least one of the plurality of hosts;
    an executable portion that presents the sense data by the device to the at least one of the plurality of hosts once per enabled logical path, the enabled logical paths being provided by a bitmap;
    an executable portion that provides notifications from the storage controller to the device of intermediate steps comprising checkpoints during a warmstart of the storage controller; and
    monitors, by the device, the checkpoints provided by notification by the storage controller; wherein the checkpoints are either completed or failed by determination of a predetermined timeframe.

10. The computer program product of claim 9, further including an executable portion that uses the checkpoints, by the device, to provide the expected recovery timeframe by sense data to the at least one of the plurality of hosts.

11. The computer program product of claim 9, wherein, for providing the expected recovery timeframe, the sense data contains one of a time value indication and a severity indication, the severity indication being cross-referenced with a table of time value indications.

12. The computer program product of claim 9, further including an executable portion that notifies the at least one of the plurality of hosts when the recovery operation is completed.

* * * * *